United States Patent [19]

Fukui et al.

[11] 4,303,618

[45] Dec. 1, 1981

[54] CATALYTIC REACTOR

[75] Inventors: Jun Fukui, Nishinomiya; Senji Niwa, Kakogawa; Norihiro Kawashima, Akashi; Kenro Ueshima; Katumi Shimizu, both of Kakogawa, all of Japan

[73] Assignee: Kawasaki Jukogyo Kabushiki Kaisha, Kobe, Japan

[21] Appl. No.: 201,487

[22] PCT Filed: Nov. 27, 1979

[86] PCT No.: PCT/JP79/00301

§ 371 Date: Jul. 27, 1980

§ 102(e) Date: Jul. 21, 1980

[30] Foreign Application Priority Data

Nov. 27, 1978 [JP] Japan ................. 53-146732

[51] Int. Cl.³ ................. B01J 8/06; B01J 19/18
[52] U.S. Cl. ................. 422/190; 29/157 R; 422/197
[58] Field of Search ............... 422/190, 197, 311, 312; 29/157 R

[56] References Cited

U.S. PATENT DOCUMENTS 3,566,961  3/1971  Lorenz et al. ................. 422/197

FOREIGN PATENT DOCUMENTS

| 2419492 | 11/1979 | France ................. 422/197 |
| 52-107270 | 9/1977 | Japan . |
| 53-40689 | 4/1978 | Japan . |
| 53-130273 | 11/1978 | Japan . |
| 54-11065 | 1/1979 | Japan . |
| 468642 | 8/1975 | U.S.S.R. ................. 422/312 |

Primary Examiner—Bradley Garris
Attorney, Agent, or Firm—Fleit & Jacobson

[57] ABSTRACT

Disclosed is a catalytic reactor in which a plurality of pipe-shaped catalysts are arranged, said reactor including a catalyst-supporting structure which is capable of varying the distance between the adjacent catalysts. Disclosed is also a method for constructing such a reactor, said method comprising optimally setting the distance between the adjacent catalysts from one operation to another.

2 Claims, 10 Drawing Figures

$f \propto u^{-0.09}$

CATALYTIC REACTOR

TECHNICAL FIELD:

The present invention relates to a catalytic reactor and more particularly to a catalytic reactor utilizing pipe-shaped catalysts and a method for constructing the same, the reactor being suitable for use, for example, as a reactor for dry denitrification.

BACKGROUND ART:

Although a variety of systems for dry denitrification have been hitherto proposed, most of them utilize a moving-bed reactor in which particulate catalysts are used. This is because a packed-bed reactor utilizing particulate catalysts has a disadvantage that the catalyst bed is blocked by foreign materials such as dust which are contained in the gas to be treated. As one way for overcoming such a disadvantage, it was proposed to use a "dust-free" catalyst. However, dust-free catalysts have not been put into a practical use since most of the dust-free catalysts do not yet exhibit a sufficient resistance to dusts and further, dust-free catalysts generally have a low catalytic surface area per volume and hence need to be loaded in a larger amount as compared with particulate catalysts.

However, along with development of more active dust-free catalysts, a denitrification device utilizing dust-free catalyst has been recently recognized because of its structural simplicity and easiness of operation. There are a variety of shapes of dust-free catalysts, some typical examples being pipe-shaped catalyst, honeycomb-shaped catalyst, plate-shaped catalyst and so on. Among these, pipe-shaped catalyst is the most advantageous, as compared with the other dust-free catalysts, particularly with honeycomb-shaped catalyst, because of its lower cost since it is easy to be shaped, has low loss of catalyst material in shaping and further, can be manufactured with the use of a relatively small-scale device. With the recent enlargement of dry denitrification systems, the cost of the catalyst and the cost of the reactor have come to contribute more to the overall cost of the system. Therefore, a pipe-shaped catalyst, because of its low cost, is suitable for use particularly in a large-scale device for dry denitrification.

Although pipe-shaped catalyst is highly rated in the economical sense as stated above, it has disadvantages due to the arrangement thereof in the reactor. As seen from FIGS. 1(A) and (B) showing partial cross sectional views of reactors, pipe-shaped catalysts have been hitherto arranged in reactors in the square closest packing mode (A) or triangular closest packing mode (B). The gas to be treated is to pass through flow passages as defined by the inner surfaces of the pipe-shaped catalysts (the passages designated as 1 or 1') and also through flow passages as defined by the outer surfaces of the pipe-shaped catalysts (the passages designated as 2 or 2'). However, the flow passages as defined by the inner surfaces and the flow passages as defined by the outer flow passages are greatly different from each other in their cross sectional shapes as seen from FIGS. 1 (A) and (B), and hence, the states of the gas flowing through such two types of passages are greatly different. This will be clear from the following fact.

Figure 1A:
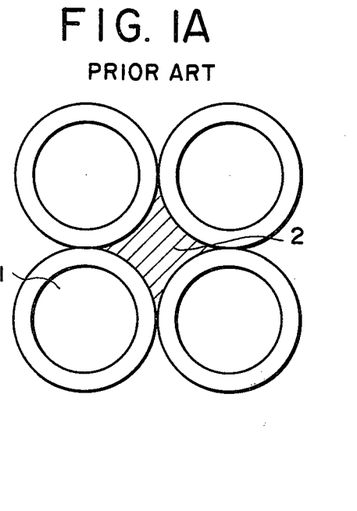
Figure 1B:
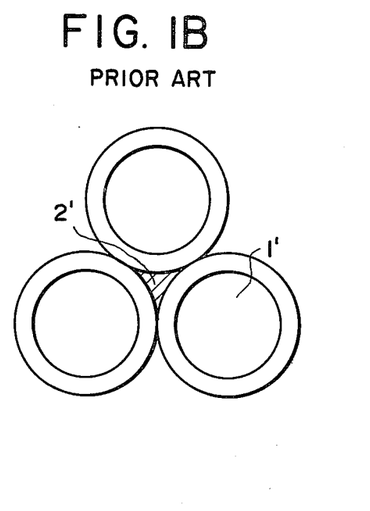
Figure 2:
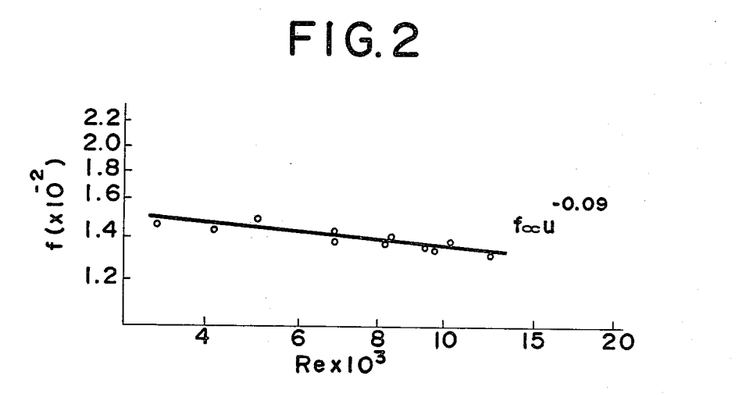
FIG. 2, FIG. 3 and FIG. 4 graphically show the results of fluid dynamic experiments achieved by the present inventors, for a case where the catalysts are arranged as shown in FIG. 1 (A).
Figure 3:
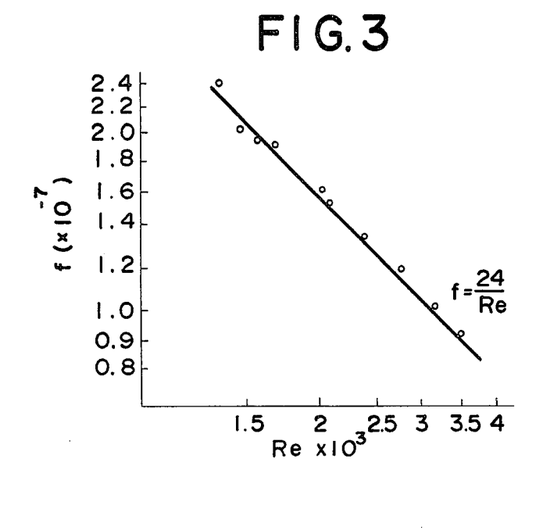
Figure 4:
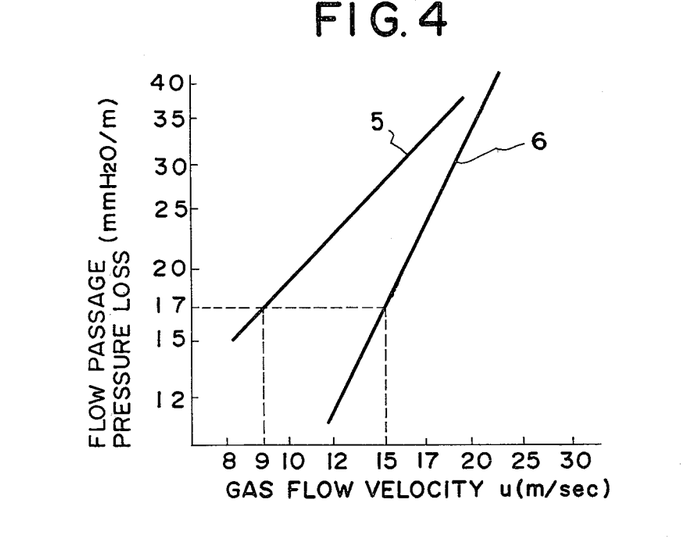

FIG. 2, FIG. 3 and FIG. 4 show the results of fluid dynamic experiments carried out by the present inventors, for the case where pipe-shaped catalysts, each having an inside diameter of 21 mm and an outside diameter of 32 mm, are arranged in the square closest packing mode shown in FIG. 1(A).

The graph of FIG. 2 shows the relationship between the Reynolds number (Re) and the friction factor (f) of the gas flowing in the flow passages as defined by the inner surfaces of the pipe-shaped catalyst. The graph of FIG. 2 clearly shows the characteristic of turbulent flow in a rough-wall pipe, as is well known in fluid dynamics.

The graph of FIG. 3 shows the relationship between the Reynolds number (Re) and the friction factor (f) of the gas flowing in the flow passages as defined by the outer surfaces of the pipe-shaped catalysts. From FIG. 3, it is understood that the gas flow is laminar in the outer surface flow passages.

FIG. 2 and FIG. 3 show the results of experiments made with the same pressure drop across the outer surface flow passages and across the inner surface flow passages. In a practical reactor for dry denitrification, the pressure drop across the outer surface flow passages and that across the inner surface flow passages are equal. Thus, from the experimental data as shown in FIG. 2 and FIG. 3, it is understood that, in a reactor in which the catalysts are arranged as shown in FIG. 1 (A), the gas flows in turbulent flow through the inner surface flow passages and in laminar flow through the outer surface flow passages.

FIG. 4 shows the experimental results (those as shown in FIG. 2 and FIG. 3) in terms of the relationship between linear velocity of the gas flowing through the passages and pressure loss per meter of the length of the passages. From FIG. 4, it is understood that for yielding a given pressure loss, the gas velocity for the inner-surface flow passages (graph 5) and that for the outer-surface flow passage (graph 6) are much different from each other. Further, since the cross-sectional area of an inner-surface flow passage is approximately 346 mm$^2$ and the cross sectional-area of an outer-surface flow passage is approximately 218 mm$^2$, the difference in terms of the gas flow rate (linear velocity multiplied by cross sectional area) is greater.

As shown in FIG. 2 through FIG. 4, although the total catalytic surface area of the outer-surface passages are larger than that of the inner-surface flow passages, the gas flows through the outer-surface flow passages at a smaller flow rate and further in a laminar flow. It can be therefore said that the outer-surface flow passages are not sufficiently utilized as catalyst and, from the stand point of efficient utilization of the catalyst, there is too much loss in such conventional modes of catalyst arrangement as the square closest packing arrangement mode.

Furthermore, in a case where the gas velocity is extremely low locally in the flow passages, there is a risk that the dust contained in the gas will accumulate so as to lead the blockage of the flow passages in addition to the lowering of catalytic activity. As a matter of fact, it was confirmed through the experiments of the present inventors that such dust accumulated in the circumferential portions in the outer-surface flow passages.

As a way for overcoming the above-mentioned disadvantages, i.e., for equalizing the flow states of the gas in the two types of flow passages, it may be proposed to make the shapes of the two passages to be hydrodynamically similar and more particularly, as a concrete and simple answer, to arrange pipe-shaped catalysts so that the hydraulic diameters of the two passages are equal. This solution is based on a hydrodynamic assumption that the friction factor for all of the flow passages are equal. However, as seen from FIG. 2 and FIG. 3 based on the experiments of the present inventors and showing that the friction factor for the outer-surface flow passages is different from friction factor for laminar flow in a cylindrical tube, when the geometrical shapes of flow passages are different, the friction factors for the passages are different. In addition, as will be explained later, the friction factor is closely related to the catalytic reaction rate constant. Therefore, from the standpoint of catalytic reaction engineering, such a determination of the distance between the catalysts, in disregard of the difference in friction factors, will not achieve any practical effects.

DISCLOSURE OF THE INVENTION

Accordingly, the principal object of the present invention is, for a catalytic reactor in which a plurality of pipe-shaped catalysts are arranged, to make more efficient use of the catalysts through more strict analysis from the stand point of reaction engineering than those hitherto made.

After strenuous studies, the present inventors have found that, for more efficient use of a catalytic reactor in which a plurality of pipe-shaped catalysts are arranged, the cross-sectional area of the outer flow passages as defined by the spaces between the outer surfaces of the pipe-shaped catalysts should be varied depending upon the operation conditions to be employed and the catalytic activity, rather than in the conventional modes of catalyst arrangement such as the square closest packing or triangular closest packing modes, and further that the distance between adjacent pipe-shaped catalysts should be set so that the flows of the reactant gas are in turbulent flow not only in the inner flow passages as defined by the inner surfaces of the pipes but also in the outer flow passages and also so that the following relationship is satisfied:

$$K_1(S_1/G_1) = K_2(S_2/G_2) \tag{1}$$

where
- $G_1$ is flow rate of the reactant gas through each of the inner flow passages;
- $G_2$ is flow rate of the reactant gas through the outer flow passage per pipe-shaped catalyst,
- $S_1$ is cross-sectional area of each of the inner flow passages,
- $S_2$ is cross-sectional area of the outer flow passage per pipe-shaped catalyst,
- $K_1$ is apparent reaction rate constant with respect to the catalytic reaction occuring in the inner flow passages,
- $K_2$ is apparent reaction rate constant with respect to the catalytic reaction occuring in the outer flow passages.

Thus, according to the present invention, there is provided a catalytic reactor in which a plurality of pipe-shaped catalysts are arranged in parallel with each other and in which a catalytic reaction proceeds within the flow passages as defined by the inner surfaces of said pipe-shaped cataysts and also within the flow passages as defined by the spaces between the outer surfaces of said pipe-shaped catalysts, characterized in that said reactor includes a catalyst-supporting structure for supporting said pipe-shaped catalysts which is capable of varying the distance between adjacent pipe-shaped catalysts, whereby the cross-sectional area of said flow passages as defined by the spaces between the outer surfaces of the pipe-shaped catalysts are optimally set depending upon the operation conditions of the reactor.

Further, according to the present invention there is provided a method for constructing the abovementioned catalyst, characterized in that the distance between adjacent pipe-shaped catalysts is set in accordance with calculated value of the hydraulic diameter of the outer flow passage per pipe-shaped catalyst, the calculation being made for conditions under which the flows of the reactant gas are turbulent in both said inner flow passages and said outer flow passages and the following relationship is satisfied:

$$K_1(S_1/G_1) = K_2(S_2/G_2)$$

BRIEF DESCRIPTION OF THE DRAWING

FIGS. 1 (A) and (B) are partial cross sectional view of conventional catalytic reactors and show arrangements of pipe-shaped catalysts.

BEST MODE FOR CARRYING OUT THE INVENTION

With respect to a reactor in which a suitable number of pipe-shaped catalysts having predetermined inside and outside diameters are arranged in parallel at equal distances, it can be approximated that, to each of the pipe-shaped catalysts, except for the ones arranged in the vicinity of the reactor wall, there are imparted one inner flow passage of equivalent cross sectional area and one outer flow passage of equivalent cross sectional area. For a catalytic reactor, such as practical device for dry denitrification, in which a great number of pipe-shaped catalysts are arranged, the error due to such approximation is negligible.

Thus, in Eq. (1) in the above, the cross-sectional area of each of the inner flow passages, $S_1$, can be expressed as $\pi(D_1/2)^2$ where $D_1$ is the inside diameter of the pipe-shaped catalyst, the cross-sectional area of the outer flow passage per pipe-shaped catalyst, $S_2$, as $L_2D_2/4$ where $L_2$ is the length of reactant gas-catalyst contact in said outer flow passage and $D_2$ is the hydraulic diameter of the flow passage per pipe-shaped catalyst, the flow rate of the gas through each of the inner flow passages, $G_1$, and $S_1u_1$ where $u_1$ is the linear velocity of the reactant gas through each of the inner flow passages, and, the flow rate of the gas through the outer flow passage per pipe-shaped catalyst, $G_2$, as $S_2u_2$ where $u_2$ is the linear velocity of the reactant gas through the outer flow passages per pipe-shaped catalyst.

Accordingly, if the reaction rate constant $K_1$ can be expressed in terms of $u_2$ and the reaction rate constant $K_2$ can be expressed in terms of $u_2$ and $D_2$, then, Eq. (1), which is for a catalytic reactor in which pipe-shaped catalysts of predetermined inside diameter $D_1$ are arranged, can be expressed in terms of $u_1$, $u_2$ and $D_2$.

It is said that the catalytic reduction reaction of nitrogen oxides with ammonia in a first-order reaction with respect to the concentration of the nitrogen oxides in the gas to be treated. For a case, as denitrification reaction just mentioned, where the reaction is a first-order reaction with respect to the concentration of reactant and the reaction proceeds in the vicinity of the outer surface of the catalyst, it is known that apparent reaction rate constant can be given by the following equation:

$$1/K = (1/K_a) + (S/L)(1/K_fA) \quad (2)$$

where
- $K_a$ = reaction rate constant with respect to catalyst surface,
- $K_fA$ = film coefficient of mass transfer,
- $S$ = cross sectional area of flow passage,
- $L$ = length of gas-catalyst contact.

In Eq. (2), $K_a$ is intrinsic to the properties of the catalyst per se including its catalytic activity and $K_fA$ is mainly determined by the state of gas flow.

For the reaction occuring in the inner flow passages and that in the outer flow passages, respectively, the following equations apply:

$$1/K_1 = (1/K_a) + (S_1/L_1)(1/K_fA_1) \quad (2')$$

$$1/K_2 = 1/K_a + (S_2/L_2)(1/K_fA_2) \quad (2'')$$

Hereinafter, subscripts 1 and 2 indicate conditions for the inner flow passages and for the outer flow passages, respectively. $K_fA$ and the state of gas flow can be correlated to each other, for example, by the following equation:

$$Jd = (K_fA/u)(Sc)^{\frac{2}{3}} = \tfrac{1}{2}f \quad (3)$$

where $Jd$ is Chilton-Colburn's mass transfer factor, $Sc$ is the Schmidt number, $f$ is the friction factor and $u$ is the linear velocity of gas. Eq. (3) is an empirical equation supported by a number of experiments, and further it has been confirmed that the relation expressed by this equation is applicable regardless of whether the gas is in turbulent flow or in laminar flow and regardless of the geometrical shape of flow passage.

The pressure loss across a catalyst bed, $\Delta P$, is given by $$\Delta P_1 = 2f_1 u_1^2 \rho / D_1 g_c \quad (4)$$

$$\Delta P_2 = 2f_2 u_2^2 \rho / D_2 g_c \quad (5)$$

where $f_1$ and $f_2$ are the friction factors, $D_1$ and $D_2$ are the hydraulic diameters, $u_1$ and $u_2$ are the gas linear velocities, $\rho$ is the gas density and $g_c$ is the gravitational conversion factor (9.8 m/sec$^2$).

It is known that the friction factor, $f_1$, $f_2$, can be expressed as a function of Re (Reynolds number) by means of experiments. For example, $f_1$ is empirically expressed as shown by the straight line of FIG. 2 by $$f_1 = 0.0304 \, Re_1^{-0.09} \quad (6)$$

where $4000 < Re_1 < 12{,}000$.

Figure 5:
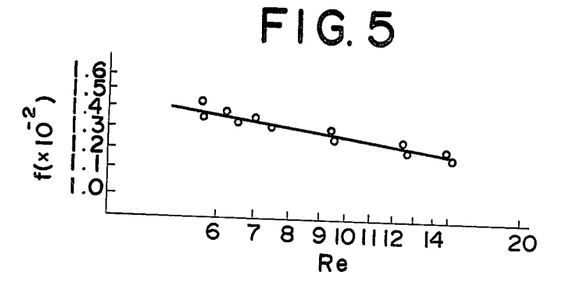
FIG. 5 graphically shows the relationship between friction factor and Reynolds number for the outer flow passages of the pipe-shaped catalyst, which is necessary in the practice of the invention.

According to the present invention, pipe-shaped catalysts are arranged in a reactor so that the gas is to flow in turbulent flow not only in the inner flow passages but also in the outer flow passages. For accomplishing this, in the practice of the present invention, the friction factor for the outer flow passages, $f_2$, is empirically predetermined in terms of Reynolds number for a certain range of hydraulic diameter of the flow passage, $D_2$. FIG. 5 shows an example of such empirical data, and it is seen therefrom that $f_2$ is expressed in the terms of Reynolds number ($Re_2$) by the following equation $$f_2 = 0.0553 \, Re_2^{-0.154} \quad (7)$$

where
$4500 < Re_2 < 15000$
$20 \times 10^{-3}$ (m) $< D_2 < 40 \times 10^{-3}$ (m)

Figure 6:
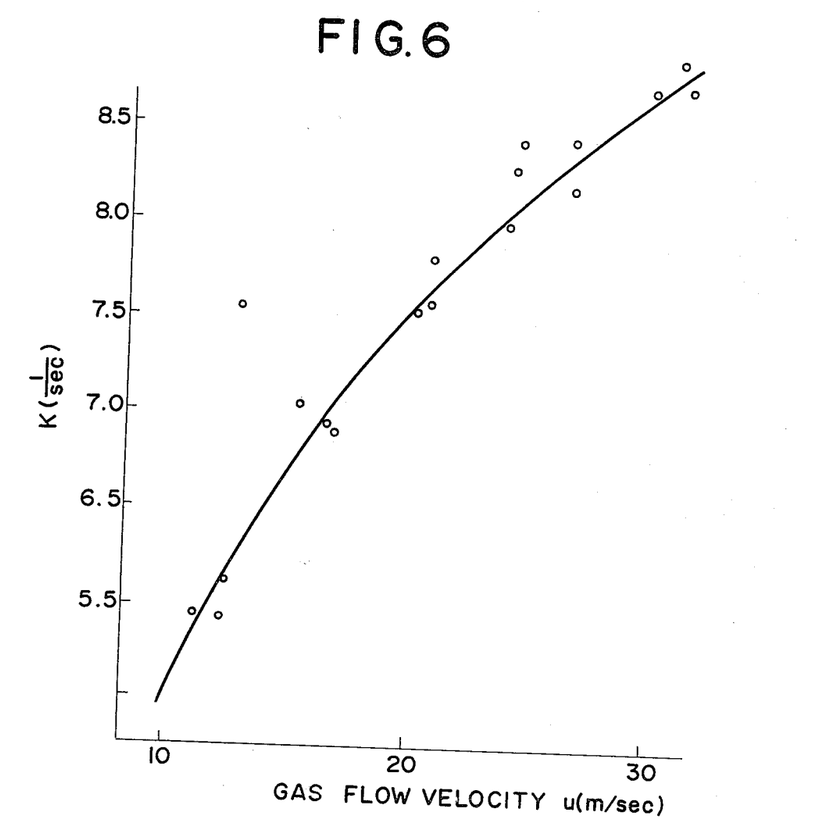
FIG. 6 shows the relationship between gas linear velocity and apparent reaction rate constant for the case where the reactant gas flows through the inner flow passages of the pipe-shaped catalysts, which is necessary in the practice of the present invention.

For simplifying Eqs. (2') and (2''), it is necessary to obtain the values for $Ka$ and $Sc$, as understood with reference to Eq. (3). Thus, as a convenient way for obtaining the values for $Ka$ and $Sc$, the values for apparent reaction rate constant are utilized by the present inventors, the values having been obtained beforehand by reaction procedure which is conducted by passing the reactant gas through only the inner flow passages defined by the pipe-shaped catalysts. For example, FIG. 6 shows relationship between the gas linear velocity and the reaction rate constant for dentrification reactions which were conducted at the temperature of 350° C. by passing the reactant gas through only the inner flow passages of the pipe-shaped catalysts.

From Eqs. (3) and (6), $K_fA_1$ is given by $$K_fA_1 = au_1^{0.91} \quad (8)$$

where $a$ is an unknown proportion constant.

Thus, for example, since, from the data of the activity test at 350° C.

at $u_1 = 3$ (m/sec)   $K_1 = 8.63$
at $u_1 = 20$ (m/sec)   $K_1 = 7.52$, substitution of these values in Eq. (2) yields $$\frac{1}{8.63} = \frac{1}{Ka} + \frac{5.25 \times 10^{-3}}{a \times 30^{0.91}} \quad (9)$$

$$\frac{1}{7.52} = \frac{1}{Ka} + \frac{5.25 \times 10^{-3}}{a \times 20^{0.91}} \quad (10)$$

By the solution of Eqs. (9) and (10), the values for $Ka$ and $Sc$ are obtained as follows.

$Ka = 12.9$ (1/sec)
$Sc = 1.7056$

By putting the values obtained, Eq. (2') becomes $$\frac{1}{K_1} = \frac{1}{12.9} + \frac{5.25 \times 10^{-3}}{0.006198 \, u_1^{0.91}} \quad (11)$$

where $5.25 \times 10^{-3}$ is the value for S/L of the inner flow passage.

The curved line in FIG. 6 shows the relationship between gas linear velocity $u_1$(m/sec) and denitrification reaction rate constant $K_1$ in the inner flow passage of the pipe-shaped catalyst, and is in a close agreement with the values obtained previously by the activity test which are shown by the dots in the same figure.

Since the properties of the catalyst, including catalytic activity, are the same both for the outer flow passages and the inner flow passages, the value for Ka as obtained in the above-mentioned manner can be utilized in obtaining $K_2$, the reaction rate constant for the outer flow passages. In addition, as a convenient way, it is assumed that the value for Sc which has been obtained for the inner flow passages is applicable to the outer flow passages as well. Thus, from Eqs. (2''), (3) and (7), the apparent reaction rate constant with respect to the reaction occurring in the outer flow passages is given by the following equation $$\frac{1}{K_2} = \frac{1}{12.9} + \frac{D_2}{4} \times \frac{1}{4.2329 \times 10^{-3} D_2^{-0.154} u_2^{0.348}} \quad (12)$$

Thus, $K_1$ can be expressed in terms of $u_1$ and $K_2$ can be expressed in terms of $u_2$ and $D_2$.

Since in a practical reactor the gas flows so that the pressure loss $\Delta P$ across the inner flow passages and that across the outer flow passages are equal, $\Delta P_1 = \Delta P_2$. Therefore, by substitution of Eqs. (6) and (7) for friction factor in Eqs. (4) and (5), respectively, $u_2$ can be expressed in terms of $u_1$ and $D_2$ as given by the following equation $$u_2 = 9.9675 \, u_1^{1.0347} D_2^{0.6251} \quad (13)$$

In the manner above stated, $K_1$ can be expressed in terms of $u_1$, and $K_2$ can be expressed in terms of $u_1$ and $D_2$. Therefore, for a catalytic reactor of predetermined $L_1$, $L_2$, $D_1$ and $S_1$, Eq. (1) finally gives the relation between $u_1$ and $D_2$.

For example, in the case above exemplified, in which
$L_1 = 0.066$ m
$L_2 = 0.1005$ m
$D_1 = 21 \times 10^{-3}$ m
$S_1 = 3.463 \times 10^{-4}$ m
Eq. (1) finally becomes $$u_1(0.07752 = 0.347 \, u_1^{-0.91}) = 9.968 D_2^{0.6251} u_1^{1.0347} (0.07752 + 8.44 s \, D_2^{0.6251} u_1^{-0.8753}) \quad (14)$$

Some examples of calculation in accordance with Eq. (14) are tabulated below.

| $u_1$ (m/sec) | 9.2 | 9.5 | 10 | 10.5 | 11 | 11.5 | 12 |
|---|---|---|---|---|---|---|---|
| $D_2$ (mm) | 22.23 | 22.30 | 22.24 | 22.18 | 22.12 | 22.07 | 22.02 |
| $u_1$ | 13 | 14 | 15 | 16 | 17 | 18 | 20 |
| $D_2$ | 21.92 | 21.83 | 21.74 | 21.67 | 21.57 | 21.53 | 21.40 |

If $D_2$, the hydraulic diameter of the outer flow passage per pipe-shaped catalyst, is obtained by the calculation in the above manner, then it is easy to obtain the value for the distance between the centers of the pipe-shaped catalyst as will be described below, and the pipe-shaped catalysts may be arranged in the reactor in accordance with such value.

Figure 7:
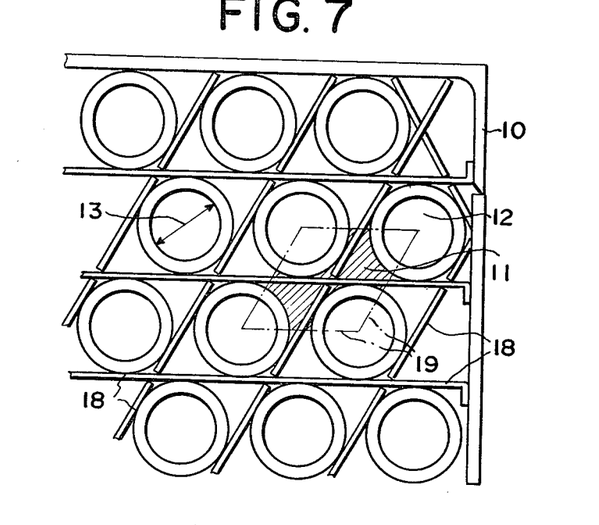
FIG. 7 is a partial cross-sectional view of an example of the reactor according to the present invention.

For example, in the case where a plurality of pipe-shaped catalyst are to be arranged at equal distances in a triangular arrangement as shown in FIG. 7, the cross sectional area of the outer flow passages, $S_2$, is given by the following equation.

$$S_2 = \frac{\sqrt{3}}{2} x^2 - \frac{\pi}{4} d_2^2 \quad (15)$$

where x is the distance between the centers of the pipe-shaped catalysts and $d_2$ is the outside diameter of the pipe-shaped catalyst.

Since $S_2 = L_2 D_2/4$, Eq. (15) becomes $$\frac{L_2 D_2}{4} = \frac{\sqrt{3}}{2} x^2 - \frac{\pi}{4} d_2^2 \quad (16)$$

Accordingly, in the case where $L_2 = 0.1005$ (m) and $d_2 = 32 \times 10^{-3}$ (m), if the calculated value of $D_2$ is $21.74 \times 10^{-3}$ (m) at 15 m/sec, it follows from Eq. (16) that:

$x = 0.039$ (m)

Furthermore, it was found by the present inventors that in the actual arrangement of the catalysts, strict contentment of the value for $D_2$ with Eq. (1) is not always needed, but, satisfactory results will be obtained if the hydraulic diameter is so determined that it falls within the range of 0.9a to 1.25a where a is the value for $D_2$ calculated from Eq. (1).

Therefore, according to the present invention, the catalysts are optimally arranged from one operation to another, depending upon the linear velocity of reactant gas or flow rate of reactant gas employed.

When the pipe-shaped catalysts are supported at a suitable distance and the distance between the catalysts are so set that the above equation (1) is satisfied and further the flows of the gas are in turbulent flow in both the inner and outer flow passages in accordance with the present invention, there are obtained such effects as listed below:

(a) The amount of catalysts can be reduced in comparison with the conventional arrangement of closest catalyst packing.

(b) The size of the reactor can be reduced in comparison with the arrangement of closest catalyst packing.

(c) There are now flow passages where the gas flow rates are retarded, so that the accumulation of dust is prevented.

(d) The pressure loss can be reduced in comparison with the closest catalyst packing arrangement.

The above effects are confirmed by the following examples.

Figure 8:
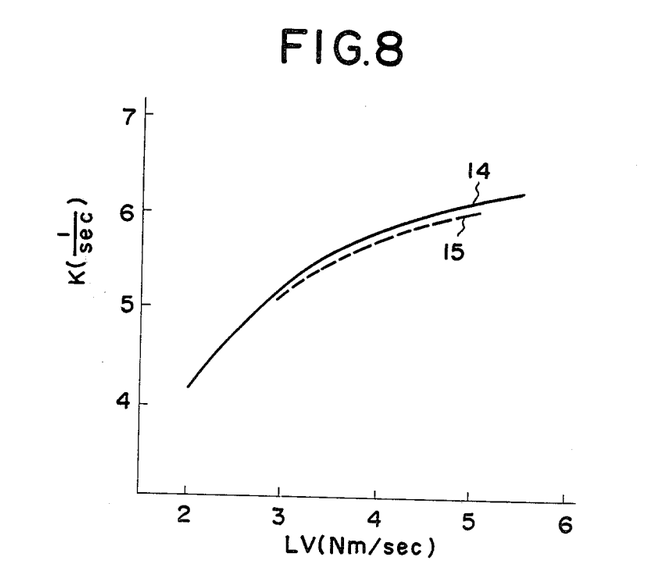
FIG. 8 and FIG. 9 graphically show the results of experiments on denitrification reaction with the use of the reactor of the present invention, in comparison with those with a conventional reactor.
Figure 9:
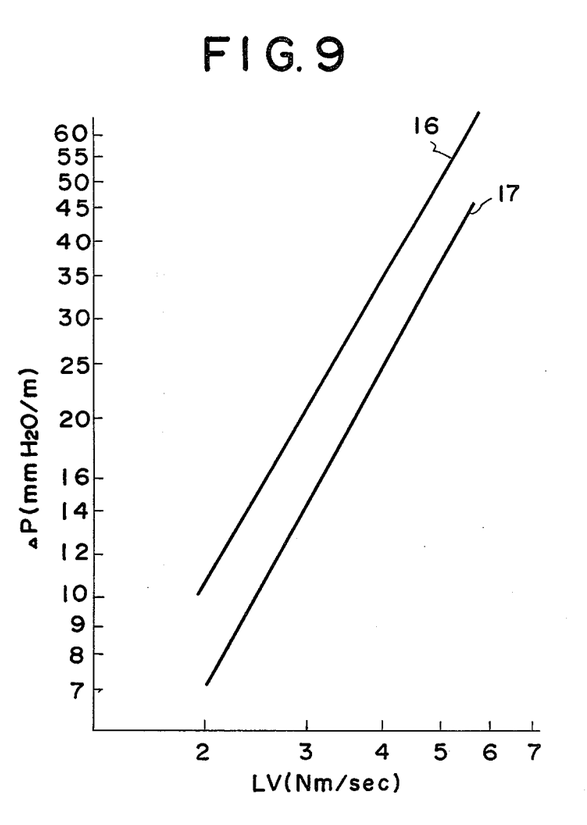

FIG. 7 is a partial cross sectional view of an embodiment of the reactor of the present invention. In this embodiment, the catalyst-supporting structure of the reactor comprises partition plates 18 which separate the pipe-shaped catalyst from each other and support said catalysts. In FIG. 7, 10 is the surrounding wall of the reactor, 11 (the region as hatched) is the outer flow passage per pipe-shaped catalyt, 12 is the inner flow passage, 13 is $D_1$, and 19 is x, the distance between the catalysts to be obtained from the hydraulic diameter $D_2$. The results are shown in FIG. 8 and FIG. 9 on the experiments of denitrification reaction with the reactor as shown in FIG. 7, in comparison with those with a reactor in which pipe-shaped catalysts, having the same outside and inside diameters, are arranged in the closest square packing mode. The temperature was 340° C.

The apparent reaction rate constants (K) as shown in FIG. 8 are not the ones with respect to each of the pipe-shaped catalysts, but the ones with respect to the overall volume of the reactors. LV signifies space velocity of the gas in terms of the normal conditions. As seen from this figure, the apparent reaction rate constants with respect to the overall reactor volume, those as shown by curved line 15, for the case where the catalysts are optimally arranged in accordance with the present invention in the triangular arrangement with the distance between the centers of the catalysts being 37 mm, are substantially equal to those, as shown by the curved line 14, for the case of the square closest packing arrangement. Thus, it was appreciated that the amount of the catalysts for the same total volume of reactor is reduced, through the optimal arrangement of the catalyst of the present invention, by approximately 20% as compared with the square closest packing arrangement.

FIG. 9 shows pressure loss per meter of the reactor length, $\Delta P$, against LV. Straight line 16 shows the values for square closest packing, while straight line 17 shows the values for the optimal arrangement in the staggered mode in accordance with the present invention where the distance between the centers of the catalysts is 37 mm. The values for pressure loss as shown by FIG. 9 are not the ones for the catalysts only, but the ones for the supporting structure in addition to the catalysts. From FIG. 9, it is seen that, for the same value of space velocity, the pressure loss can be reduced by approximately 30% through the optimal setting, in accordance with the present invention, of the distance between the supported catalysts.

According to the present invention, the distance between pipe-shaped catalysts can be readily calculated depending upon a predetermined flow velocity of reactant, in the manner as described above. In addition, the above equations can also be solved simultaneously with equation(s) for expressing the reaction rate in the reactor. In such a manner, Eq. (1) can be expressed finally in terms of $D_2$ and the conversion ratio of the reactant, and thus, the distance between the catalysts may be set depending upon a predetermined conversion ratio of the reactant.

Although the present invention has been described mainly with respect to a reactor for dry denitrification, it should be noted that the invention is applicable to any other catalytic reaction process in which a similar reactor is employed and the reaction proceeds according to a similar mechanism to that for the denitrification reaction.

We claim:

1. A catalytic reactor in which a plurality of pipe-shaped catalysts are arranged in parallel with each other and in which a catalytic reaction proceeds within the flow passages as defined by the inner surfaces of said pipe-shaped catalysts and also within the flow passages as defined by the spaces between the outer surfaces of said pipe-shaped catalysts, characterized in that said reactor includes a catalyst-supporting structure for supporting said pipe-shaped catalysts which is capable of varying the distance between adjacent pipe-shaped catalysts, whereby the cross-sectional area of said flow passages as defined by the spaces between the outer surfaces of the pipe-shaped catalysts is optimally set depending upon the operation conditions of the reactor by arranging the pipe-shaped catalysts so that the following relationship is satisfied:

$$K_1(S_1/G_1) = K_2(S_2/G_2)$$

where
$S_1$ = cross sectional area of each of the inner flow passages,
$S_2$ = cross sectional area of the outer flow passage per pipe-shaped catalyst,
$G_1$ = flow rate of the reactant gas through each of the inner flow passages,
$G_2$ = flow rate of the reactant gas through the outer flow passage per pipe-shaped catalyst,
$K_1$ = apparent reation rate constant with respect to the catalytic reaction occurring in the inner flow passages, and
$K_2$ = apparent reaction rate constant with respect to the catalytic reaction occurring in the outer flow passages.

2. A method for constructing a catalytic reactor which comprises arranging a plurality of pipe-shaped catalysts of predetermined inside and outside diameters, in parallel with each other, so that the inner surfaces of said pipe-shaped catalysts define inner flow passages and the spaces between the outer surfaces of said pipe-shaped catalysts define outer flow passages in order to feed reactant gas into said inner flow passages and said outer flow passages, characterized in that the distance between adjacent pipe-shaped catalysts is set in accordance with a calculated value of the hydraulic diameter of the outer flow passages per pipe-shaped catalyst, the calculation being made for conditions under which the flows of the reactant gas are turbulent in both said inner flow passages and said outer flow passages and the following relationship is satisfied:

$$K_1(S_1/G_1) = K_2(S_2/G_2)$$

where
$S_1$ = cross sectional area of each of the inner flow passages,
$S_2$ = cross sectional area of the outer flow passage per pipe-shaped catalyst,
$G_1$ = flow rate of the reactant gas through each of the inner flow passages,
$G_2$ = flow rate of the reactant gas through the outer flow passage per pipe-shaped catalyst,
$K_1$ = apparent reaction rate constant with respect to the catalytic reaction occurring in the inner flow passages, and
$K_2$ = apparent reaction rate constant with respect to the catalytic reaction occurring in the outer flow passages.

* * * * *